United States Patent

[11] 3,617,567

| [72] | Inventor | Owen Bertwell Mathre<br>Wilmington, Del. |
|---|---|---|
| [21] | Appl. No. | 825,038 |
| [22] | Filed | May 15, 1969 |
| [45] | Patented | Nov. 2, 1971 |
| [73] | Assignee | E. I. du Pont de Nemours and Company<br>Wilmington, Del. |

[54] DESTRUCTION OF CYANIDE IN AQUEOUS SOLUTIONS
6 Claims, No Drawings

[52] U.S. Cl. .................................................. 210/50,
23/84, 204/55
[51] Int. Cl. ....................................................... C02c 5/04
[50] Field of Search .......................................... 23/79, 84,
151; 210/50, 63; 252/175; 204/55

[56] References Cited

UNITED STATES PATENTS

| 2,105,835 | 1/1938 | Krause .......................... | 210/63 X |
| 3,200,069 | 8/1965 | Eisenhauer .................... | 210/63 |
| 3,510,424 | 5/1970 | Zumbrunn ..................... | 210/63 |

FOREIGN PATENTS

| 646,440 | 8/1962 | Canada .......................... | 210/15 |
| 1,564,915 | 3/1969 | France .......................... | 210/63 |
| 895,742 | 5/1962 | Great Britain ................ | 210/62 |

OTHER REFERENCES

Oehme, F., et al., Galvanotechnik Und Oberflachenschutz, 1, 74– 84 (1966) No. 3, (Copy Supplied and Placed in the File)

*Primary Examiner*—Michael Rogers
*Attorney*—Robert W. Black

ABSTRACT: A process for the destruction of cyanide anions in aqueous solutions is provided using hydrogen peroxide and a soluble metal compound catalyst such as a soluble copper compound to increase the reaction rate. An aqueous composition containing hydrogen peroxide and the catalyst is also provided which can be added directly to the cyanide solution. The pH of the cyanide solution to be treated is adjusted with acid or base to a pH of about 8.3 to 11, the soluble metal compound catalyst is added at a level to give about 5 to 1,000 p.p.m. of catalyst, the hydrogen peroxide is added to give a molar ratio of hydrogen peroxide to cyanide anions of at least about 0.8 and the temperature of the solution is maintained within the range of about 20° to 75°C.

DESTRUCTION OF CYANIDE IN AQUEOUS SOLUTIONS

BACKGROUND OF THE INVENTION

1. Field of Invention

This invention relates to processes for the destruction of cyanide anions in aqueous solutions and aqueous hydrogen peroxide compositions which can be added to cyanide-containing solutions.

2. Prior Art

Government regulations concerning the discharge of cyanides from industrial plants is becoming more strict. The current methods for eliminating cyanide from industrial plant effluent are chlorination and vacuum concentration of dilute solutions followed by return of the concentrate to the process. The former method involves the use of hypochlorite or chlorine and yields an effluent that contains variable amounts of hypochlorite. In some areas, the excess chlorine discharged from the plant is looked upon as a pollutant. The vacuum concentration method is finding increased application in the cyanide zinc-plating field but is still unsatisfactory for many plants.

While the reaction of hydrogen peroxide with sodium and potassium cyanide has been reported in the art, it is calculated therefrom that treatment times required to destroy the cyanide in a typical cyanide zinc electroplating plant effluent would be several days. Treatment times greater than 8 hours will not find any application in the zinc electroplating industry. Preferably, reaction times should not exceed 1 hour.

SUMMARY OF THE INVENTION

According to the present invention there is provided a process for the destruction of cyanide anions comprising: (a) preparing an aqueous solution comprising cyanide anions, hydrogen peroxide and a metal catalyst selected from the group consisting of soluble silver, tungsten and vanadium compounds and copper, said solution having a pH of about 8.3 to 11 and containing the catalyst at a concentration of from about 5 to 1,000 p.p.m. and at least about 0.8 mole of hydrogen peroxide per mole of cyanide anions; and (b) maintaining said solution at a temperature of about 20° to 75° C. to effect destruction of the cyanide anions.

According to the present invention there is also provided a process for the destruction of cyanide anions in an aqueous solution comprising: (a) adjusting the pH of the solution within the range of about 8.3 to 11; (b) adding to the solution a metal compound catalyst soluble therein so that the solution contains from about 5 to 1,000 p.p.m. of catalyst, said metal compound catalyst selected from the group consisting of silver, copper, tungsten and vanadium compounds; (c) adding hydrogen peroxide to the solution to give a molar ratio of hydrogen peroxide to cyanide anions of at least about 0.8 and maintaining the solution at a temperature within the range of about 20° to 75° C.

There is also provide an aqueous composition comprising about 20 to 80 percent by weight hydrogen peroxide; about 0.1 to 5 percent by weight of a water-soluble copper compound and about 0.1 to 10 percent by weight of mineral acid such as sulfuric acid, nitric acid or phosphoric acid.

DETAILED DESCRIPTION OF THE INVENTION

While the emphasis in the present application is directed to the treatment of an aqueous cyanide zinc electroplating waste stream, the process of the invention is applicable to a wide variety of cyanide streams. Any aqueous stream containing cyanide anions ($CN^1$) can be treated, e.g., cyanide waste from other metal-finishing processes, mining operations and chemical plants as long as any complex metal cyanides present dissociate to sodium cyanide for destruction of resulting cyanide anions.

In the destruction of cyanide in these waste streams, it has been found that the pH, temperature, catalyst and hydrogen peroxide-cyanide ratio strongly influence both the time required to destroy the cyanide and the amount of hydrogen peroxide that must be added to the waste stream. The pH of the waste stream must be adjusted to within the range of about 8.3 to 11, preferably about 8.5 to 10.5. For a zinc electroplating waste stream which is alkaline, a mineral acid such as sulfuric acid is generally added to the stream to lower the pH to the necessary range. While hydrochloric acid can be used, it is generally not preferred due to its highly corrosive behavior in process equipment. For acidic cyanide-containing waste streams such as result in the acrylonitrile manufacturing process from air, ammonia and propylene, the pH must be raised to the requisite level with an alkaline material, such as sodium hydroxide or lime. If the pH is allowed to drift outside of the specified limits, the rate of destruction of the cyanide decreases substantially. Additionally, wasteful hydrogen peroxide decomposition becomes more significant as the pH rises above 10.0. The pH should not be allowed to drop below 8.3 because of the possible evolution of toxic hydrocyanic acid.

Since the reaction between hydrogen peroxide and cyanide to yield cyanate, carbonate and formate proceeds slowly, a soluble catalyst must be added to the solution. Such catalyst are metal compounds of vanadium and tungsten, preferably as the salts of alkali metals and soluble silver compounds such as silver nitrate, silver chloride or silver sulfate. The most preferred catalyst is a soluble copper compound such as potassium copper cyanide, copper sulfate, cupric acetate and copper chloride in either cuprous or cupric form. Other bath-soluble copper compounds can be used; however, only the more commercially important copper salts have been listed. Copper can also be added by anodic dissolution of the metal in the waste solution. The catalyst concentration in the solution is within the range of about 5 to 1,000 p.p.m., preferably about 10 to 40 p.p.m. Although the catalyst concentration can be varied to achieve the desired reaction rate, concentrations above 100 p.p.m. are probably unnecessary. Catalyst concentrations above 50 p.p.m. should be avoided when the initial cyanide concentration exceeds 0.3 moles/liter due to the exothermic reaction between hydrogen peroxide and cyanide. The catalyst can be added to the cyanide-containing stream at any time, but preferably it is added either before the hydrogen peroxide or added simultaneously with the peroxide. Alternatively, the catalyst can be added to a hydrogen peroxide solution to form a rinse for zinc-plated metal articles, usually ferrous articles, wherein the cyanide is introduced into the rinse solution as a contaminant on the zinc-plated metal article.

Adding the catalyst and hydrogen peroxide simultaneously can be conveniently accomplished by adding an aqueous additive composition containing these materials plus a mineral acid such as sulfuric. Such a composition contains about 20 to 80 percent by weight, preferably 45 to 55 percent, of hydrogen peroxide, about 0.1 to 5, preferably 1 to 2 percent by weight, of the soluble copper compound catalyst and about 0.1 to 10 percent, preferably about 2 to 5 percent by weight, of mineral acid. It is preferred that the catalyst for the additive be a cupric compound such as cupric sulfate. The mineral acid is necessary in the additive composition in order to avoid excessive decomposition of the hydrogen peroxide. Of course, when the additive is added to alkaline cyanide-containing streams, the mineral acid also aids in lowering the pH to the requisite value. Other than these necessary ingredients, the additive can optionally contain small amounts (less than 1 percent by weight) of hydrogen peroxide stabilizers known to the art. These can be dibasic organic acids such as adipic acid and inorganic and organic phosphates and tin compounds, e.g., sodium stannate. A representative aqueous composition contains about 50 percent hydrogen peroxide, about 2 percent cupric sulfate and 3 percent sulfuric acid.

The hydrogen peroxide is added to the solution all at once to give a molar ratio of at least about 0.8, preferably 0.8 to 1.4, or in continuous increments so as to give a cumulative total molar ratio of hydrogen peroxide to cyanide of at least about 0.8, preferably about 0.8 to 1.4. In a process where the plated workpiece is contacted with a hydrogen peroxide solution containing the catalyst, the molar ratio will be substantially higher than 1.4, perhaps as high as at least 10:1. The low ratio of 0.8 is about the lowest that can be used to completely destroy the cyanide. Some of the cyanide is converted to formate without consumption of hydrogen peroxide. However, in a reaction run with continuous or incremental addition of hydrogen peroxide, this ratio only applies to the total consumed (added) since, during the reaction, the ratio is much less than 0.8. When the cyanide concentration in the waste stream exceeds 0.2 moles per liter, the hydrogen peroxide should be added continuously in order to avoid exceeding the maximum operating temperature.

The catalyzed reaction between hydrogen peroxide and cyanide can be conducted at ambient temperatures or at elevated temperatures, i.e., a temperature within the range of about 20° to 75° C. It has been observed that hydrogen peroxide decomposition increases more rapidly than the destruction of cyanide when the temperature goes much above 71° C. Due to this hydrogen peroxide decomposition and the fact that the destruction rate of cyanide is reduced a little more than 50 percent for each 10° C. drop in temperature between 71° and 25° C., a preferred temperature range is about 45° to 66° C.

Completion of the reaction between the hydrogen peroxide and cyanide using the preferred copper catalyst can be visually observed by the change in color of the solution. The copper catalyst causes the solution to turn blue. To insure that the reaction is complete, a cyanide-sensitive indicating electrode such as the Orion Specific Ion Electrode can be used to measure the cyanide level in the solution. This electrode can be used to provide a signal to operate feed equipment that will automatically meter makeup hydrogen peroxide into the solution either in continuous or spaced increments, especially the hydrogen peroxide an copper catalyst rinse solution used in zinc, alkaline cyanide electroplating.

After treatment, the neutralized solution can be further treated. For example the treated effluent from an aqueous, alkaline cyanide zinc electroplating bath can be neutralized to a pH of minimum zinc solubility (about 7.2 to 7.8) so as to precipitate zinc solids (hydroxides and carbonates). The zinc solids can be separated from the solution by settling or filtration and reused to make up the zinc electroplating bath. Other heavy metal solids from various cyanide plating operations, e.g., nickel, cadmium and copper can also be separated in this manner.

The invention can be further understood and is illustrated by the following examples in which parts are by weight unless otherwise indicated.

EXAMPLE 1

Transferred 50 ml. of pH=9 sodium carbonate-bicarbonate buffer (0.5 M total carbonate) and 3.2 ml. 0.49 M hydrochloric acid solution to a glass tube and heated in a water bath to 46.5° C. Then added 0.5 ml. 24 percent sodium cyanide solution and 0.0075 ml. of 1.39 M potassium copper cyanide solution and mixed. Then 0.355 g. of 35 percent hydrogen peroxide solution was added and mixed. Samples were taken periodically and analyzed for sodium cyanide using the Orion Specific Ion Electrode. The results are shown in table I.

EXAMPLES 2-9

Following the procedure of example 1, sodium cyanide in solution was destroyed with hydrogen peroxide catalyzed with varying amounts of various catalysts. Control examples were run without a catalyst. The conditions and results are shown in table I. Silver nitrate titration and the Orion Electrode were used interchangeably for cyanide analysis.

TABLE I.—DESTRUCTION OF SODIUM CYANIDE WITH HYDROGEN PEROXIDE

| Example No. | Treated solution (M×10³) Initial H₂O₂ conc. | Treated solution (M×10³) Initial NaCN conc. | Molar ratio H₂O₂/NaCN | pH | Temp., ° C. | Catalyst, mg./l. (p.p.m.) | Reaction time (hrs.) $t_{1/2}$ [a] | Reaction time (hrs.) $t_t$ [b] | H₂O₂ consumption at $t_{1/2}$, mol./mol. NaCN |
|---|---|---|---|---|---|---|---|---|---|
| 1 | 66.9 | 45.4 | 1.47 | 9.08 | 46.5 | [f] 12.1 | 0.21 | 0.58 | |
| 2 | 54.0 | 49.2 | 1.10 | 9.00 | 46.5 | [f] 17.2 | 0.12 | | 0.48 |
| Control | 11.7 | 9.7 | 1.21 | 9.00 | 46.5 | | 0.55 | | 0.84 |
| 3 | 11.7 | 10.2 | 1.15 | 9.00 | 46.5 | [f] 17.5 | 0.03 | | 0.48 |
| 4 | 64.6 | 43.3 | 1.49 | 9.02 | 46.5 | [f] 224.0 | | [g] 1.8 | |
| 5 | 397.7 | 128.2 | 3.10 | 9.89 | 29.0 | [f] 796.0 | | [g] 7.0 | |
| 6 | 204.1 | 170.4 | 1.20 | 9.82 | 29.0 | [f] 1,636.0 | | [g] 6.8 | |
| 7 | 54.0 | 49.1 | 1.10 | 9.00 | 46.5 | [d] 9.7 | 0.22 | 1.82 | 0.63 |
| 8 | 54.0 | 49.1 | 1.10 | 9.10 | 46.5 | [e] 9.7 | 0.65 | | 1.28 |
| 9 | 69.1 | 49.3 | 1.40 | 9.20 | 65.5 | [c] 743.0 | 0.04 | 0.67 | |
| Control | 26.7 | 23.7 | 1.13 | 12.43 | 46.5 | | 8.0 | | 1.68 |
| Do | 26.4 | 24.0 | 1.10 | 10.85 | 46.5 | | 2.33 | >24.5 | 1.01 |
| Do | 26.3 | 24.0 | 1.10 | 9.34 | 46.5 | | 1.22 | 25.0 | 0.85 |
| Do | 54.5 | 45.5 | 1.20 | 9.08 | 46.5 | | 0.90 | >5.0 | 0.77 |
| Do | 89.2 | 45.4 | 1.96 | 9.07 | 46.5 | | 0.31 | 1.25 | 0.61 |
| Do | 56.3 | 49.5 | 1.14 | 9.20 | 25.0 | | 0.85 | >6.0 | 0.21 |

[a] Time required for 50% of the cyanide an ion to be destroyed.
[b] Time required for the cyanide anion concentration to be reduced to 1 mg./l. (1 p.p.m.).
[c] AgNO₃ catalyst.
[d] NaVO₃ catalyst.
[e] Na₂WO₄·H₂O catalyst.
[f] Copper catalyst; added as CuCl dissolved in sodium chloride solution or KCN solution.
[g] Time expressed in minutes.

The control examples show that cyanide destruction is low in the absence of catalyst and also show loss of hydrogen peroxide by wasteful decomposition increase as the pH is increased, particularly at a pH above 11. The examples also show that cyanide destruction times are reduced when the temperature is increased from 25° to 66.5° C. and that silver nitrate, tungstate and vanadate increase the reaction rate of hydrogen peroxide with cyanide. While these catalysts are effective, the examples show that soluble copper is a more effective catalyst for a wide range of conditions.

EXAMPLE 10

Transferred 50 ml. of sodium carbonate-bicarbonate buffer (pH=9), 3.3 ml. of 0.49 M hydrochloric acid, 0.5 ml. cyanide zinc solution ([NaCN]=2.07 M; molar ratio [NaCN]/[Zn⁺⁺]=4.0) and 0.01 ml. of 1.39 M potassium copper cyanide solution to a glass tube heated in a water bath at 25° C. and mixed the solutions. To this was added 0.75 ml. of a water solution containing 0.355 gm. of 35 percent hydrogen peroxide. The resulting solution was mixed thoroughly. Samples were taken from the solution on a period basis and analyzed for sodium cyanide using the Orion Specific Ion Electrode. The results are shown in table II.

EXAMPLES 11-15

Following the procedure of example 10, cyanide zinc solution was treated with hydrogen peroxide to destroy the cyanide and catalyzed with varying amounts of copper catalyst. Control examples were run without a catalyst. The conditions and results are shown in table II. Silver nitrate titration and the Orion Electrode were used interchangeably for cyanide analysis.

TABLE II.—DESTRUCTION OF CYANIDE WITH HYDROGEN PEROXIDE IN ZINC CYANIDE-SODIUM CYANIDE SOLUTIONS

| Example No. | Treated solution (M×10³) | | Molar ratio $H_2O_2$/$CN^-$ | pH | Temp., °C. | [Cu] mg./l. (p.p.m.) | Reaction time (hrs.) | | $H_2O_2$ consumption at $t_{1/2}$, mol./mol. NaCN |
|---|---|---|---|---|---|---|---|---|---|
| | Initial $H_2O_2$ conc. | Initial NaCN conc. | | | | | $t_{1/2}$[a] | $t_f$[b] | |
| Control | 54.5 | 45.5 | 1.20 | 9.08 | 46.5 | 0 | 0.90 | 5 | 0.77 |
| Do | 83.5 | c52.5 | 1.59 | 9.08 | 46.5 | 0 | d5.45 | 60 | d2.26 |
| Do | 48.0 | c20.2 | 2.38 | 8.94 | 66.5 | 0 | 1.40 | (f) | |
| Do | 54.1 | c42.0 | 1.29 | 9.10 | 66.5 | 0 | e0.27 | 48 | e6.8 |
| 10 | 50.4 | e19.5 | 2.58 | 8.68 | 25.0 | 16.5 | 0.23 | 0.51 | |
| 11 | 54.7 | c41.6 | 1.32 | 8.80 | 66.5 | 5.2 | e0.10 | (f) | e5.5 |
| 12 | 53.8 | c41.6 | 1.29 | 8.77 | 66.5 | 21.6 | 0.10 | (f) | 2.10 |
| 13 | 66.9 | c19.3 | 3.46 | 8.80 | 46.5 | 11.5 | (g) | 0.19 | |
| 14 | 63.7 | c38.0 | 1.68 | 9.48 | 24.5 | 38.6 | 0.27 | 0.64 | 1.55 |
| 15 | 64.2 | c40.2 | 1.60 | 9.10 | 46.5 | 43.4 | (g) | 0.30 | 1.5 |

[a] Time required for 50% of the cyanide anion to be destroyed.
[b] Time required for the cyanide anion concentration to be reduced to 1 mg./l. (1 p.p.m.).
[c] Cyanide present as a zinc plating solution [NaCN]/[$Zn^{++}$]=4.0.
[d] 42% of NaCN destroyed.
[e] 14.5% of NaCN destroyed.
[f] $H_2O_2$ decomposed before $CN^-$ gone.
[g] Too fast.

The above examples show that zinc salts increase both the destruction time and the amount of hydrogen peroxide required to reduce the cyanide concentration in a solution to less than 1 p.p.m.; however, the addition of a soluble copper catalyst reduced both the cyanide destruction time and the peroxide required.

The present invention has the advantage of reducing the destruction time of cyanide in a waste stream from several days to less than two hours with attendant reduction of hydrogen peroxide consumption. The process of the present invention also has the following advantages:

1. Eliminates handling corrosive chlorine gas and hypochlorite pollution in waste disposal systems.

2. Storage requirements are greatly reduced and handling problems are simplified when hydrogen peroxide (20–80 percent conc. by wt.) is substituted for chlorine or hypochlorite. In addition, hydrogen peroxide is far more stable in storage than hypochlorite.

3. Eliminates possibility of discharge of chlorine compounds such as chloramine, hypochlorite and chlorine from the process. These are toxic to marine life.

4. Hydrogen peroxide can be used in destruction of cyanide in waste streams containing large amounts of ammonia and ammonium salts. Chlorine and hypochlorite react readily with these compounds to form chloramines which may be "pollutants" in some areas.

5. Byproduct zinc salt settles much more rapidly and easily than zinc salts formed from chlorination. This can simplify operation for removal of soluble zinc content from plating wastes. Also, the solid separated is dense and can be used to make zinc cyanide plating solutions.

What is claimed is:

1. A process for the destruction of cyanide anions comprising: (a) preparing an aqueous solution comprising cyanide anions, hydrogen peroxide and a metal catalyst selected from the group consisting of soluble silver, tungsten and vanadium compounds and copper, said solution having a pH of about 8.3 to 11 and containing the catalyst at a concentration of from about 5 to 1,000 p.p.m. and a molar ratio of hydrogen peroxide to cyanide anions within the range of about 0.8 to 1.4 and (b) maintaining said solution at a temperature of about 20° to 75° C. to effect destruction of the cyanide anions.

2. The process of claim 1 wherein the cyanide anions are introduced into the solution of the catalyst and hydrogen peroxide by a cyanide-contaminated metal workpiece zinc coated in an aqueous, alkaline, cyanide zinc electroplating bath.

3. The process of claim 2 wherein hydrogen peroxide is added incrementally to the solution to maintain its concentration.

4. A process for the destruction of cyanide anions in an aqueous solution comprising: (a) adjusting the pH of the solution within the range of about 8.3 to 11; (b) adding to the solution a metal compound catalyst soluble therein so that the solution contains from about 5 to 1,000 p.p.m. of catalyst selected from the group consisting of silver, tungsten and vanadium compounds and copper; (c) adding hydrogen peroxide to the solution to give a molar ratio of hydrogen peroxide to cyanide anions within the range of about 0.8 to 1.4; and (d) maintaining the solution at a temperature within the range of about 45° to 66° C. to effect destruction of the cyanide anions.

5. A process for the destruction of cyanide anions in an aqueous alkaline cyanide solution comprising: adjusting the pH of the solution within the range of about 8.5 to 10.5; adding to the solution cupric salt so that the solution contains from about 5 to 40 p.p.m. of copper; adding hydrogen peroxide to the solution to give a consumed molar ratio of hydrogen peroxide to cyanide within the range of about 0.8 to 1.4 and maintaining the solution at a temperature within the range of about 45° to 66° C. to effect destruction of the cyanide anions.

6. The process of claim 5 wherein the aqueous, alkaline solution is the effluent from an aqueous, alkaline, cyanide zinc electroplating bath and the solution, after the cyanide anions are destroyed, is neutralized to a pH within the range of about 7.2 to 7.8 to precipitate zinc solids and the zinc solids are separated from the solution.

* * * * *